United States Patent
Wada

(10) Patent No.: US 6,474,824 B1
(45) Date of Patent: Nov. 5, 2002

(54) SURFACE-EMITTING DEVICE, FRONT LIGHT, AND LIQUID CRYSTAL DEVICE

(75) Inventor: Hiroshi Wada, Horigane-mura (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/622,863

(22) PCT Filed: Dec. 14, 1999

(86) PCT No.: PCT/JP99/07019

§ 371 (c)(1),
(2), (4) Date: Aug. 23, 2000

(30) Foreign Application Priority Data

Dec. 28, 1998 (JP) ............................................. 10-37581

(51) Int. Cl.[7] ................................................ F21V 8/00
(52) U.S. Cl. ........................ 362/31; 362/330; 362/561
(58) Field of Search ............................. 362/24, 27, 555, 362/561, 330, 800, 31

(56) References Cited

U.S. PATENT DOCUMENTS 5,485,354 A * 1/1996 Ciupke et al. .............. 362/330
6,065,845 A * 5/2000 Miyazaki ..................... 362/26
6,168,281 B1 * 1/2001 Suzuki ......................... 362/330
6,239,851 B1 * 5/2001 Hatazawa et al. ........... 362/26

FOREIGN PATENT DOCUMENTS

| JP | U-62-109185 | 7/1987 |
| JP | A-9-113730 | 5/1997 |
| JP | A-11-184386 | 7/1999 |

* cited by examiner

Primary Examiner—Sandra O'Shea
Assistant Examiner—Peggy Neils
(74) Attorney, Agent, or Firm—Oliff & Berridge PLC

(57) ABSTRACT

There is provided a surface-emitting device, such as a front light, in which visibility is not deteriorated even when a point light source, such as a light-emitting diode, is used.

A surface-emitting device 20 forming a front light includes point light sources 21, such as light-emitting diodes, a transmissive light guide plate 22 made of acrylic resin, polycarbonate resin, or the like by injection molding or by other methods, a transmissive light-scattering plate 23 bonded onto an end face 22d of the light guide plate 22 opposite from the side of an end face 22c where the point light sources 21 are placed, and a reflection plate 24 bonded onto the surface of the light-scattering plate 23.

13 Claims, 4 Drawing Sheets

SURFACE-EMITTING DEVICE, FRONT LIGHT, AND LIQUID CRYSTAL DEVICE

BACKGROUND OF THE INVENTION

1. Field of the Invention

The present invention relates to a surface-emitting device, a front light, and a liquid crystal device, and more particularly, to the structure of a surface-emitting device suitably used as a front light for a liquid crystal display device.

2. Description of Related Art

Conventionally, reflective liquid crystal display panels that do not consume large amounts of power are used in portable devices and the like, whereas the displays thereof are not visible in dark conditions, such as during the night. In contrast, since transmissive liquid crystal display panels have backlights, displays thereof are visible even in dim conditions. However, the backlights consume large amounts of power, and the displays are rather difficult to view outdoors in bright daylight.

In order to solve the above problems, a liquid crystal display device having a front light serving as a surface-emitting device has been proposed in which a light guide plate is placed in front of a reflective liquid crystal display panel, light from a light source, such as a cold cathode-ray tube, placed adjacent to the end of the light guide plate, is introduced into the light guide plate, and the light is emitted from the surface of the light guide plate toward the liquid crystal display panel, thereby allowing the display to be visible even in a dark environment. In the liquid crystal display device having a front light, since the liquid crystal display panel is visible through the light guide plate in the daytime, it can be used as a normal reflective liquid crystal display panel. In a dark environment, the liquid crystal display panel is illuminated by lighting the front light, so that the display is visible.

The above-described conventional front light has a configuration in which light is substantially uniformly introduced into the light guide plate by using a linear light source, such as a cold cathode-ray tube, so as to illuminate the liquid crystal panel. In small devices, such as portable devices, it is sometimes impossible, from the viewpoint of cost and capacity, to use the cold cathode-ray tube or the like, and the cold cathode-ray tube consumes too large amount of power.

For this reason, it may be possible to reduce the cost, size, and power consumption of the devices by using a point light source, such as a light-emitting diode, which is inexpensive and which consumes a small amount of power. In this case, however, since the light-emitting diode is a point light source and has directivity in the light emitting direction, light is not uniformly emitted toward the light guide plate. As a result, the light intensity distribution (in-plane distribution) of illumination light for the liquid crystal display panel is made nonuniform, and this impairs visibility in a dark environment.

SUMMARY OF THE INVENTION

As shown in FIG. 5, in a case in which a front light 10 is provided using a light guide plate 12 composed of convex portions, each having a triangular cross section and consisting of a gently inclined face 12a and a steeply inclined face 12b, arranged on its surface in parallel and in stripes in plan view, the front light 10 is set in most cases to be viewed from the F-direction in the figure, which is slightly inclined with respect to the normal to the surface of the light guide plate 12, in order to enhance effective display brightness during illumination. As shown in FIG. 6, when a linear light source, such as a cold cathode-ray tube, is used as a light source, multiple bright lines are viewed as transverse lines due to light leaking from the steeply inclined faces 12b. As shown in FIG. 7, if point light sources 13, such as light-emitting diodes, are used as light sources in this case, short bright lines are viewed in the form of bars along the light guiding direction from the light source, which is different from the case of the linear light source, such as a cold cathode-ray tube, and therefore, visibility is further reduced, compared with the case of the linear light source.

Accordingly, the present invention has been made to overcome the above problems, and an object of the present invention is to provide a surface-emitting device, such as a front light, in which visibility is not reduced even when using a point light source such as a light-emitting diode.

An Exemplary embodiment that the present invention provides to overcome the above problems is a surface-emitting device including a transmissive light guide plate for emitting from its surface light propagating therein in a predetermined direction along the surface, and a light source placed adjacent to an end of the light guide plate so as to introduce light into the light guide plate in the other direction that is different from the predetermined direction, wherein a reflecting layer is disposed at an end of the light guide plate different from the end where the light source is placed, so as to reflect light, which propagates inside the light guide plate in the other direction, in nearly the predetermined direction inside the light guide plate.

According to this exemplary embodiment, light introduced from the light source into the light guide plate travels inside the light guide plate, is reflected by the reflection plate, travels in nearly the predetermined direction, and is emitted from the surface of the light guide plate. Since this allows a long optical path length from the light source to the emitting position, in-plane uniformity of emitted light can be enhanced when the light source has directivity, when the light source is a point light source, or when the distribution of light introduced from the light source into the light guide plate is nonuniform. When the surface-emitting device is used as a front light placed in front of various display devices, since nonuniformity of distribution of leakage light leaking frontward can be reduced, visibility can be improved. The other direction described above may be, for example, a direction along the surface of the light guide plate and opposite from the predetermined direction.

According to the above exemplary embodiment, it is preferable to interpose a light-scattering layer between the light guide plate and the reflecting layer. When the light-scattering layer is placed before the reflecting surface, light is scattered before and after reflection, in-plane uniformity of emitted light can be further enhanced.

According to the above exemplary embodiment, the light source may have directivity in the light emitting direction inside the light guide plate, and the light source may be a point light source. Particularly in these cases, the present invention is effective.

According to the above exemplary embodiment, it is preferable that the light source be a light-emitting diode. By using the light-emitting diode, the size and weight of a device having the surface-emitting devices built therein can be reduced, and manufacturing costs can also be reduced.

According to any one of the above exemplary embodiment, it is preferable that the light guide plate be structured so as not to emit the light traveling in the other direction from its surface before the light reaches the reflecting layer. When the light guide plate is formed so as not to emit light traveling in the other direction of the light introduced from the light source, since all the optical path length of light emitted from the surface of the light guide plate can be made longer than the distance from the light source to the reflecting layer, in-plane uniformity of emitted light can be enhanced.

According to any one of the above exemplary embodiment, it is preferable that the surface of the light guide plate be provided with a convex portion or a concave portion having an inclined face for emitting light from the surface.

According to the above exemplary embodiment, it is preferable that the convex portion or the concave portion be provided with a gently inclined face formed to face the other direction, as viewed from the inside of the light guide plate, and inclined at a small angle to the surface of the light guide plate, and a steeply inclined face formed to face the predetermined direction, as viewed from the inside of the light guide plate, and inclined at a large angle to the surface of the light guide plate. In this case, it is preferable that the convex portion consists of the gently inclined face and the steeply inclined face, have a triangular cross section, and be formed in stripes in plan view. In this case, when the convex portion is formed on the surface opposite from the light emitting direction and the predetermined direction and the other direction are opposite from each other, the steeply inclined face is formed on the light-source side of the convex portion, and the gently inclined face is formed on the side opposite from the light source.

According to any one of the above exemplary embodiment, it is preferable that the light source and the light guide plate be constructed as a front light to be placed in front of the panel surface of a liquid crystal device.

In accordance with another exemplary embodiment, there is provided a front light including a transmissive light guide plate for emitting from its surface light propagating therein in a predetermined direction along the surface, and a light source placed adjacent to an end of the light guide plate so as to introduce light into the light guide plate in the other direction, which is different from the predetermined direction, wherein the light guide plate allows sight therethrough, and a reflecting layer is disposed at an end of the light guide plate different from the end where the light source is placed, so as to reflect light, which propagates inside the light guide plate in the other direction, in nearly the predetermined direction inside the light guide plate.

According to this above exemplary embodiment, light introduced from the light source into the light guide plate propagates inside the light guide plate, is reflected by the reflection layer, propagates in the other direction, and is emitted from the surface of the light guide plate. Since this allows a long optical path length from the light source to the emitting position, even when directivity lies in the light emitting direction of the light source, it can be reduced. This makes it possible to improve in-plane uniformity of illumination light and to reduce nonuniformity of leakage light, thereby reducing deterioration of visibility resulting from directivity of the light source.

According to above exemplary embodiment, it is preferable to place a light-scattering layer before the reflecting surface of the reflecting layer. According to this front light, since light scattered by the light-scattering layer at a distance from the light source is emitted from the light guide plate, operations equivalent to those of the light source having low directivity can be obtained even when directivity lies in the light emitting direction of the light source, and visibility can be further improved. In particular, it is possible to further reduce directivity in a region closer to the light source, as compared with a case in which a light-scattering plate is placed on the incident surface of the light guide plate in the conventional front light structure. This reduction allows a light-scattering plate having a relatively low scattering intensity to be used, which reduces light loss.

According to above exemplary embodiment, the light source may have directivity in the light emitting direction in the light guide plate.

According to above exemplary embodiment, the present invention is effective particularly in a case in which the light source is a point light source, and it is preferable that the light source be a light-emitting diode. According to any one of above exemplary embodiment, it is particularly effective when the light guide plate is constructed so as not to emit light, traveling in the other direction, from the surface before it reaches the reflecting layer.

It may be possible to construct a reflective liquid crystal device in which the above front light is placed in front of a liquid crystal panel. In this case, high visibility can be obtained even in both bright and dark environments.

DETAILED DESCRIPTION OF THE EMBODIMENTS

Figure 1:
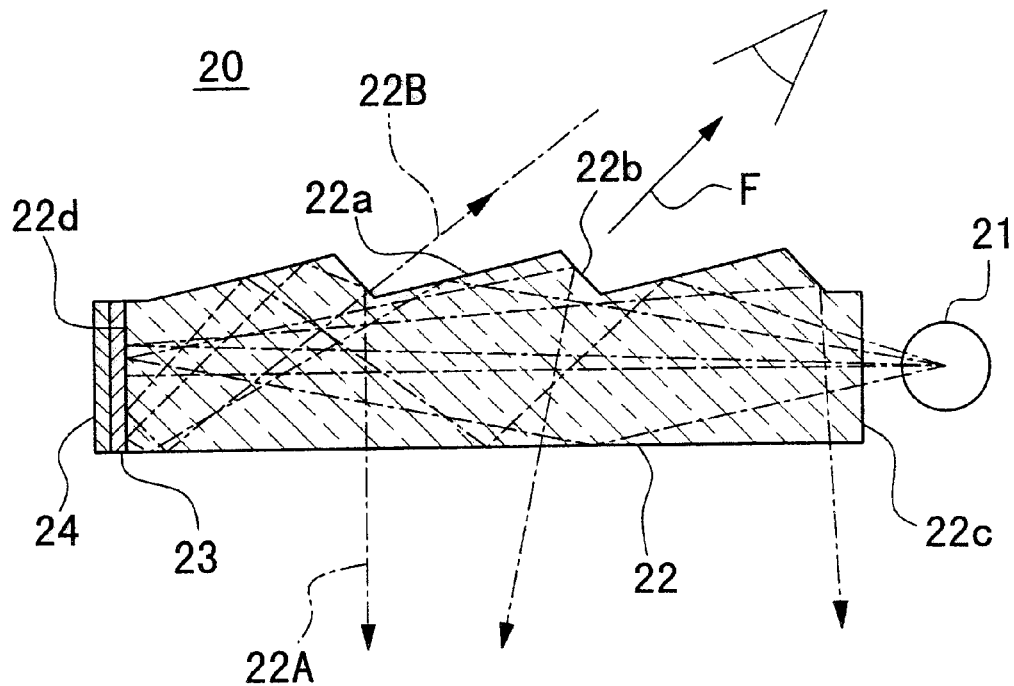
FIG. 1 is a general schematic sectional view showing the structure of a surface-emitting device (a front light) according to an embodiment of the present invention.

An embodiment of a surface-emitting device and a liquid crystal device according to the present invention will now be described in detail. FIG. 1 is a schematic sectional view showing the general structure of a surface-emitting device 20 according to the present invention. This embodiment preferably consists of comprises point light sources 21, such as light-emitting diodes, a transmissive light guide plate 22 made of acrylic resin, polycarbonate resin, or the like by injection molding or by other methods, a transmissive light-scattering plate 23 bonded onto an end face 22d of the light guide plate 22 on the side opposite from an end face 22c where the point light sources 21 are placed, and a reflection plate 24 bonded onto the surface of the light-scattering plate 23. The light-scattering plate 23 and the reflection plate 24 may be held by another member, such as a casing, while they are simply in contact with the end face 22d of the light guide plate 22, or may be formed on the end face 22d by a physical or chemical method.

On the surface of the light guide plate 22, multiple convex portions, each composed of a gently inclined face 22a and a steeply inclined face 22b, are arranged in stripes and in parallel. In FIG. 1, the number of the convex portions is limited to three, and the shape of the convex portions is enlarged and schematically shown for easy understanding. Even when light, which propagates along the surface of the light guide plate 22, impinges on the rear face of the light guide plate and the gently inclined faces 22a, it is totally reflected without leaking outside because of the high refractive index of the light guide plate, and propagates again along the surface inside the light guide plate while hardly changing its propagating direction. Light is emitted as leakage light 22B toward the front side of the light guide plate 22 when it is incident on the steeply inclined faces 22b at a smaller angle than the critical angle, and is totally reflected when it is incident on the steeply inclined faces 22b at a larger angle than the critical angle. When the reflected light reaches the rear face of the light guide plate 22 and is incident on the rear face at a larger angle than the critical angle, it is totally reflected and propagates again inside the light guide plate. In contrast, when the reflected light is incident on the rear face at a smaller angle than the critical angle, it is not reflected and is emitted downward as illumination light 22A from the rear face of the light guide plate 22. In this case, since the average emitting direction of the illumination light 22A becomes closer to the direction of the normal to the surface of the light guide plate 22 as the inclination of the steeply inclined faces 22b increases, illumination efficiency is improved. Simultaneously, since the proportion of light, which is incident on the steeply inclined faces 22b at a smaller angle than the critical angle, increases, more leakage light 22B is not totally reflected and is emitted from the steeply inclined faces 22b. Since visibility becomes lower as the amount of the leakage light 22B increases, the inclination angle of the steeply inclined faces 22b is appropriately set to be, for example, approximately 30° to 50°. The light emitting structure of the light guide plate 22 for emitting light from the rear face is not limited to the above-described convex portions.

In this embodiment, light emitted from the point light sources 21 travels to the left side in the figure along the surface of the light guide plate for a time. While a part of the light impinges on the gently inclined faces 22a and the rear face, most of it is totally reflected by the gently inclined faces 22a and the rear face and still propagates inside the light guide plate 22. The inclination angle of the gently inclined faces 22a is determined so that light, which is emitted from the point light sources 21 and impinges on the gently inclined faces 22a, is not totally reflected and does not leak outside, and so that the number and area of the gently inclined faces 22a are not reduced due to the increase in formation pitch of the convex portions resulting from the increase in length of the oblique lines of the gently inclined faces 22a in cross section, as viewed from the light traveling direction.

When the light reaches the left end face 22d of the light guide plate 22 in the figure, it passes through the light-scattering plate 23, is reflected by the reflection plate 24, and travels to the right in the figure inside the light guide plate 22. Since the steeply inclined faces 22b are formed on the front side in the traveling direction of the reflected light, most of the light, which impinges on the steeply inclined faces 22b, is totally reflected and is emitted as illumination light 22A from the rear face of the light guide plate 22. A part of the light passes as leakage light 22B through the steeply inclined faces 22b.

Figure 2:
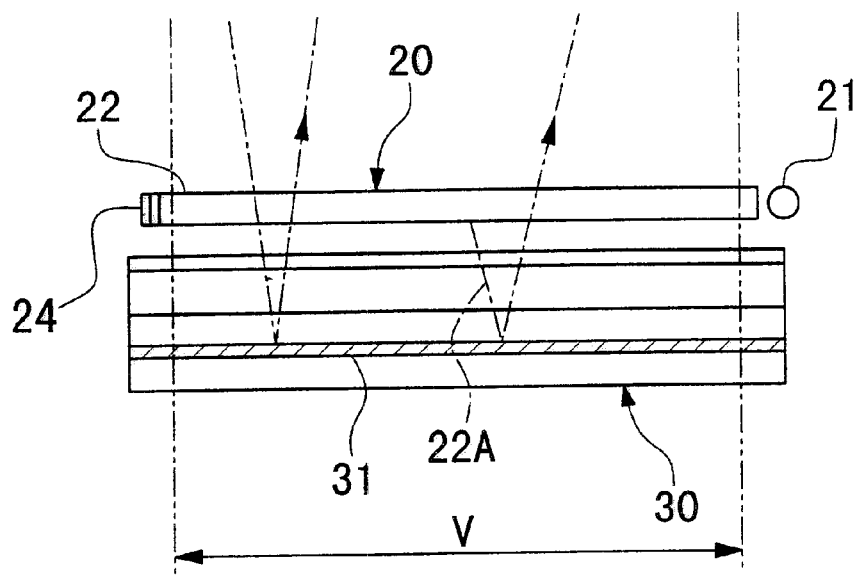
FIG. 2 is a general structural view showing the general structure of a liquid crystal device using the embodiment.

FIG. 2 shows the general configuration of a liquid crystal device having the above-described surface-emitting device 20 as a front light. The liquid crystal device has a configuration in which the light guide plate 22 of the surface-emitting device 20 is placed on the front side of a reflective liquid crystal display panel 30 with a reflecting layer 31. When it is light outside, the surface-emitting device 20 transmits and guides external light into the reflective liquid crystal display panel 30 so that a display produced in a display region V of the reflective liquid crystal display panel 30 can be viewed by the light reflected by the reflecting layer 31. In contrast, when it is dark outside, since illumination light 22A can be applied from the lower side of the light guide plate 22 toward the reflective liquid crystal display panel 30 by lighting the point light sources 21, a display produced in the reflective liquid crystal display panel 30 can be viewed by the illumination light 22A.

Figure 3:
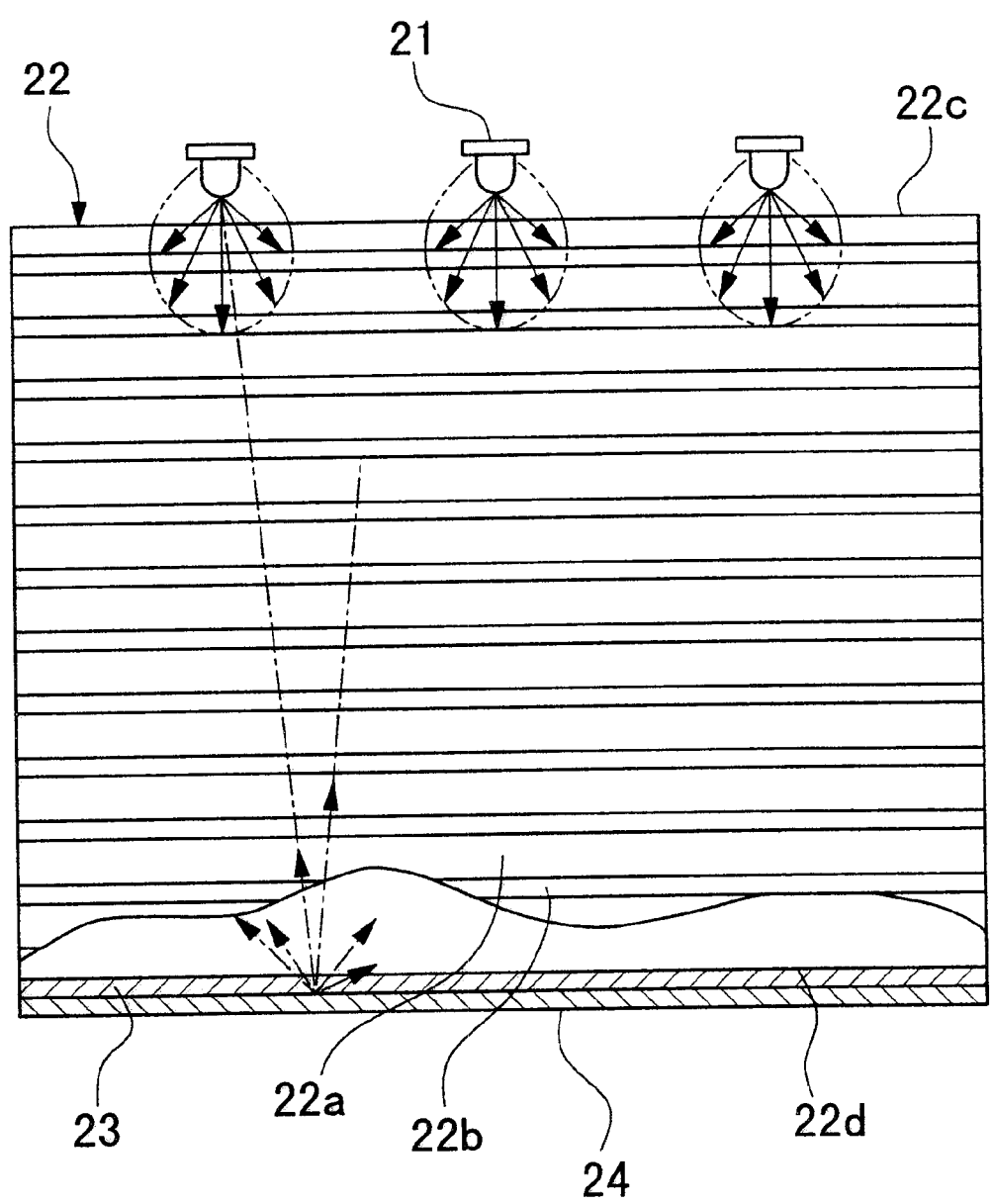
FIG. 3 is a partially sectional general plan view showing the state of light distribution in plan in the embodiment.
Figure 4:
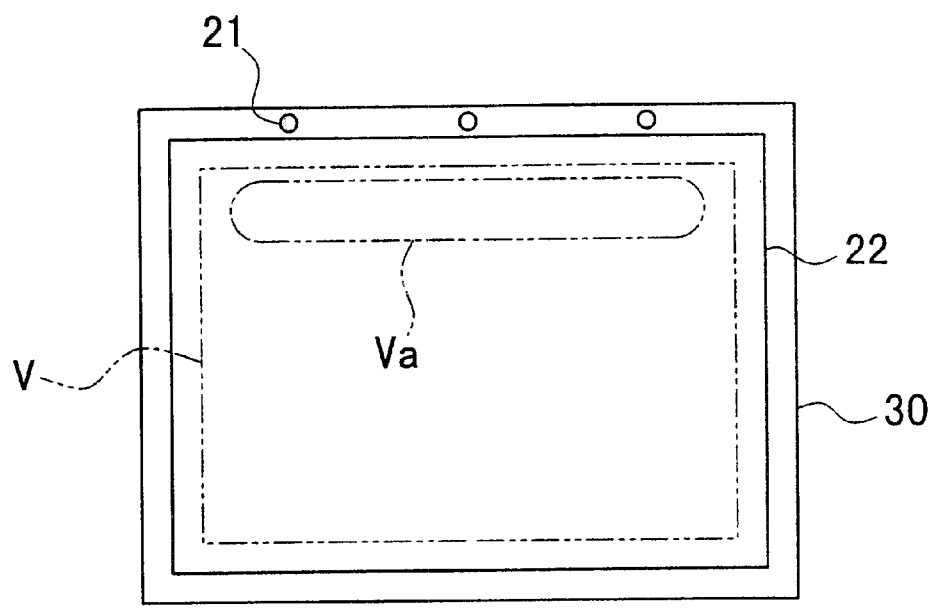
FIG. 4 is a general plan view showing the general planar structure of the liquid crystal device using the embodiment.
Figure 5:
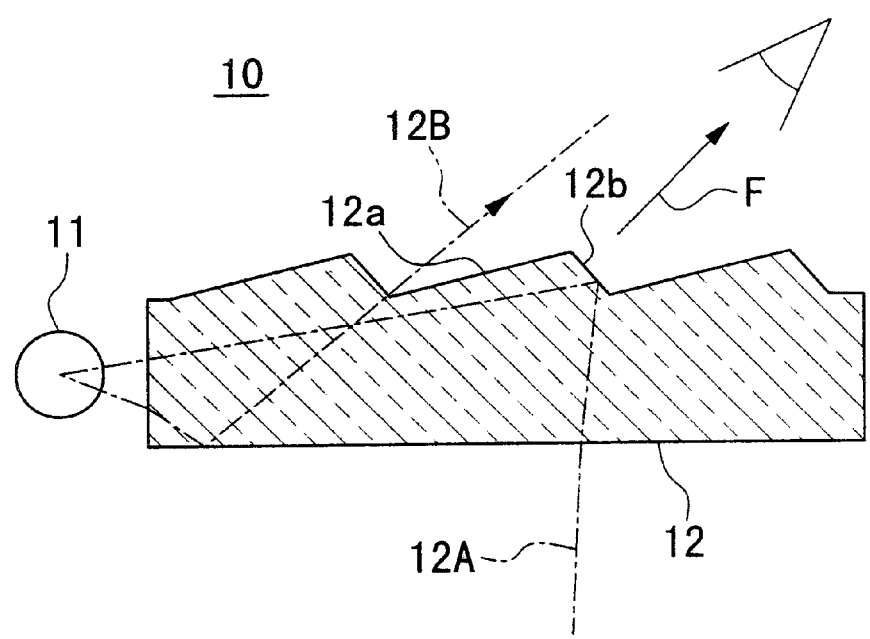
FIG. 5 is a general schematic sectional view showing the general structure of a conventional front light.
Figure 6:
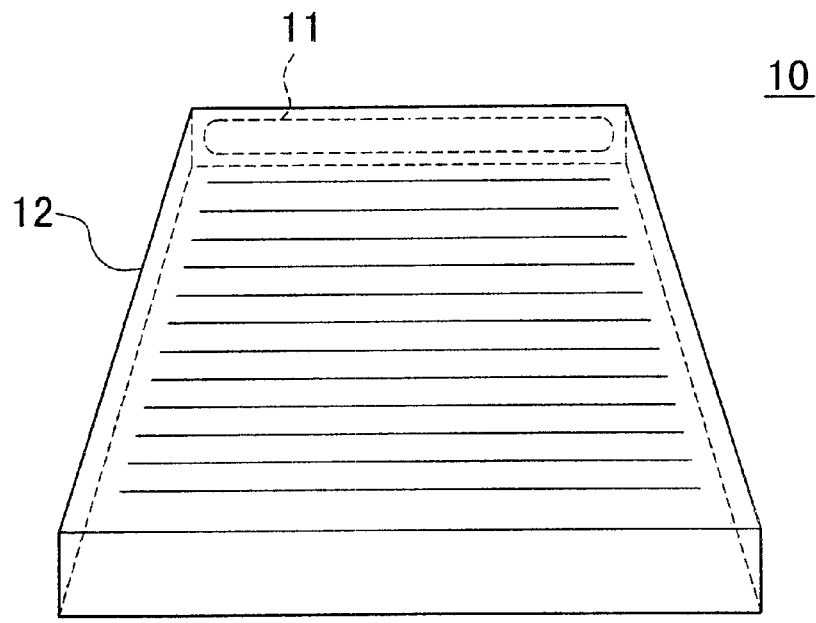
FIG. 6 is an outward explanatory view showing the outward view of the conventional front light in which a linear light source is used as a light source.

FIG. 3 is a partial sectional plan view of the above-described surface-emitting device 20. Three point light sources 21 are arranged at nearly regular intervals along one end face 22c of the light guide plate 22. Each of the point light sources 21 has light emitting characteristics having directivity so that illuminance is highest in the frontward direction, as shown by the arrows in the figure, and so that illuminance rapidly decreases away from the frontward direction. Therefore, in a case in which illumination is performed using light, which travels from the light source 11 along the faces of the light guide plate 12, as in the conventional front light shown in FIG. 5, when the point light sources 21 are adopted instead of the light source 11, sufficient in-plane uniformity of illumination light cannot be obtained in a light-source-adjacent region Va of a display region V shown in FIG. 4 close to the point light sources 21 of the light guide plate 22. In this case, a method is possible which yields sufficient in-plane uniformity of illumination light, even in the light-source-adjacent region Va, by diffusing light by a light-scattering plate or the like interposed between the point light sources 21 and the light guide plate 22. In a case in which the light-scattering plate is placed on the incident surface of the light guide plate, when a sufficient optical path length is ensured by placing the point light sources 21 at a sufficient distance from the light guide plate, light scattered by the surface of the light-scattering plate becomes equivalent to light from a linear light source, and therefore, in-plane uniformity can be obtained. In this case, while the light-scattering plate may provide a low scattering intensity, this causes a structural problem because a sufficient distance is required between the light guide plate and the point light sources. Since a light-scattering plate with a high scattering intensity is necessary to obtain similar advantages in a state in which the point light sources 21 are disposed adjacent to the light guide plate, light loss is great, and it is difficult to obtain sufficient brightness. Conversely, an excessively large amount of power is consumed in order to obtain sufficient brightness.

Figure 7:
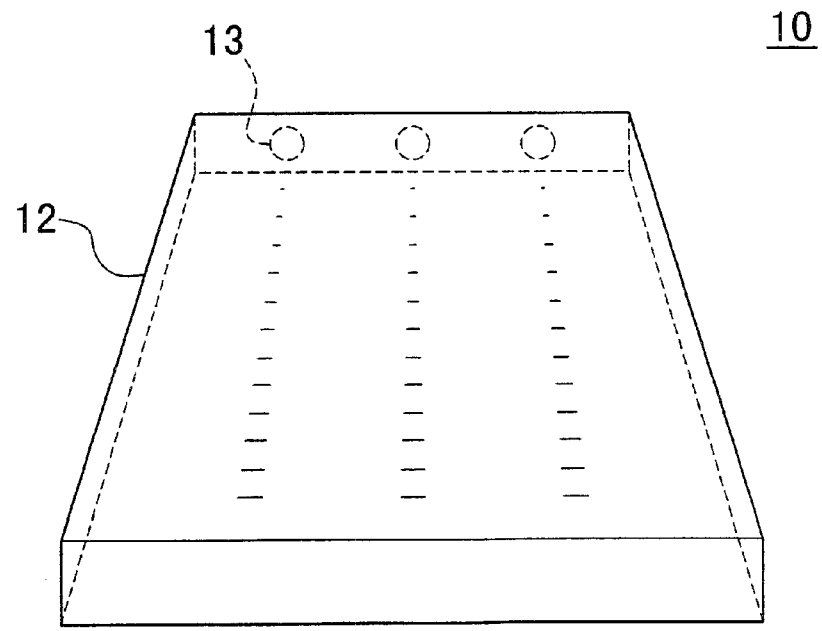
FIG. 7 is an outward explanatory view showing the outward view of the conventional front light in which point light sources are used as a light source.

In this embodiment, when light is introduced from the point light sources 21 into the light guide plate 22, as shown in FIG. 3, most of the light reaches an opposite end 22d, is scattered and reflected by the light-scattering plate 23 and the reflection plate 24 disposed at the opposite end 22d, and is radiated downward as illumination light 22A from the steeply inclined faces 22b. Since a long optical path length can be obtained from the point light sources 21 to the light-scattering plate 23, even when the scattering intensity of the light-scattering plate 23 is low, light scattered by the light-scattering plate 23 becomes equivalent to light from the linear light source. Accordingly, it is possible to obtain a sufficient in-plane uniformity of the illumination light 22A, and to reduce nonuniformity of leakage light 22B, as shown in FIG. 7.

If directivity of the point light sources 21 is not very high, it is possible to ensure a certain degree of in-plane uniformity of illumination light and a certain degree of uniformity of leakage light without using the light-scattering layer 23. The light-scattering effect may be obtained by roughening the. surface (reflecting surface) of the reflection plate 24, or by making minute pits and projections on the surface of the reflection plate 24 by causing another material to selectively adhere thereto, instead of using the light-scattering plate 23. The end face 22d of the light guide plate may be made into a light-scattering portion by forming minute pits and projections thereon.

In a case in which the density and shape of the light-emitting structure, such as the above-described convex portions, gradually change along the light traveling direction in order to make the in-plane distribution of illumination light uniform as the surface-emitting device, in this embodiment, they change along the traveling direction (that is, in the rightward direction in FIG. 1) of reflected light from the reflecting surface of the reflecting layer, such as the reflection plate 24, whereby in-plane uniformity of the illumination light 22A can be enhanced.

Industrial Applicability

As described above, in the surface-emitting device of the present invention, light led from the light source into the light guide plate travels inside the light guide plate, is reflected by the reflection plate, travels nearly in a predetermined direction, and is emitted from the surface of the light guide plate. Since this can ensure a long optical path length from the light source to the emitting position, in-plane uniformity of emitted light can be enhanced when the light source has directivity, when the light source is a point light source, or when the distribution of light guided from the light source into the light guide plate is nonuniform. When this surface-emitting device is used as a front light placed on the front side of various displays, electrical engineering devices, and electronic devices, since nonuniformity of the distribution of leakage light leaking toward the front side is reduced, visibility can be improved.

What is claimed is:

1. A surface-emitting device, comprising:
  a transmissive light guide plate that emits from its surface light propagating therein in a first direction along its plate plane, the front surface of said light guide plate comprising a convex portion or a concave portion having an inclined face that emits light from the front surface;
  a light source placed adjacent to a first end of said light guide plate that introduces light into said light guide plate in a second direction different from the first direction; and
  a reflecting layer, disposed at a second end of said light guide plate different from the first end where said light source is placed, that reflects light which propagates inside said light guide plate in the second direction in nearly the first direction, inside said light guide plate,
  said convex portion or said concave portion of said front surface of said light guide plate comprising a gently inclined face formed to face the second direction, as viewed from the inside of said light guide plate, and inclined at a small angle to the rear face of said light guide plate, and a steeply inclined face formed to face the first direction, as viewed from the inside of said light guide plate, and inclined at a large angle to the rear face of said light guide plate.

2. The surface-emitting device according to claim 1, further comprising a light-scattering layer interposed between said light guide plate and said reflecting layer.

3. The surface-emitting device according to claim 1, said light source having directivity in a light emitting direction inside said light guide plate.

4. The surface-emitting device according to claim 1, said light source being a point light source.

5. The surface-emitting device according to claim 3, said light source being a light-emitting diode.

6. The surface-emitting device according to claim 1, said light guide plate not emitting light traveling in the second direction from its surface before the light reaches said reflecting layer.

7. A front light, comprising:
  a transmissive light guide plate that emits from front surface light propagating therein in a first direction along its plate plane, the front surface of said light guide plate comprising a convex portion or a concave portion having an inclined face that emits light from the front surface;
  a light source placed adjacent to a first end of said light guide plate that introduces light into said light guide plate in a second direction different from the first direction, said light guide plate allowing sight therethrough; and
  a reflecting layer disposed at a second end of said light guide plate different from said first end where said light source is placed, that reflects light which propagates inside said light guide plate in the second direction in nearly the first direction, inside said light guide plate,
  said convex portion or said concave portion of said front surface of said light guide plate comprising a gently inclined face formed to face the second direction, as viewed from the inside of said light guide plate, and inclined at a small angle to the rear face of said light guide plate, and a steeply inclined face formed to face the first direction, as viewed from the inside of said light guide plate, and inclined at a large angle to the rear face of said light guide plate.

8. The front light according to claim 7, further comprising a light-scattering layer placed before a reflecting surface of said reflecting layer.

9. The front light according to claim 7, said light source having directivity in a light emitting direction in said light guide plate.

10. The front light according to claim 7, said light source being a point light source.

11. The front light according to claim 9, said light source being a light-emitting diode.

12. The front light according to claim 7, said light guide plate not emitting light traveling in the second direction from the surface before the light reaches said reflecting layer.

13. A liquid crystal device comprising:
  a liquid crystal pane: and
  the front light according to claim 7 provided in front of the liquid crystal panel.

* * * * *

UNITED STATES PATENT AND TRADEMARK OFFICE
CERTIFICATE OF CORRECTION

PATENT NO.    : 6,474,824 B1
DATED         : November 5, 2002
INVENTOR(S)   : Hiroshi Wada It is certified that error appears in the above-identified patent and that said Letters Patent is hereby corrected as shown below:

<u>Title page,</u>
Item [30], change the Foreign Application Priority Data from:
"(JP)....10-37581" to -- (JP)....10-373581 --

Signed and Sealed this

Twenty-fifth Day of March, 2003

JAMES E. ROGAN
*Director of the United States Patent and Trademark Office*